Dec. 16, 1958 R. EDWARDS 2,864,198
FISHING DEVICE WITH TRAP-HOOKS
Filed Nov. 4, 1957
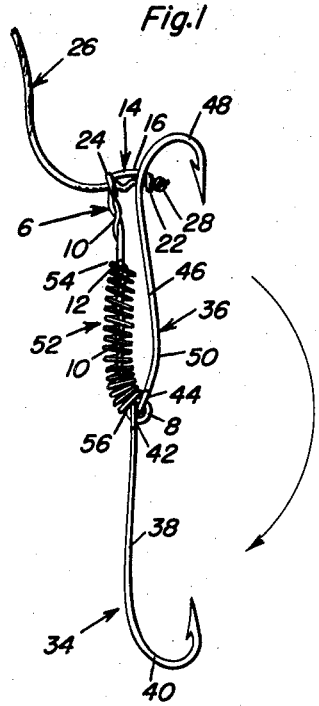
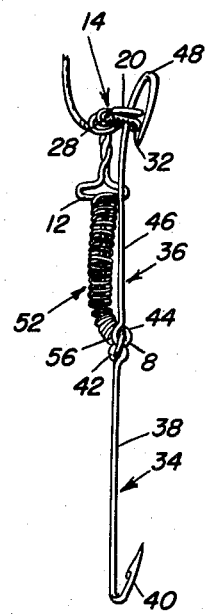
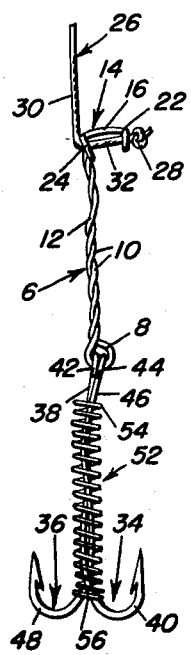
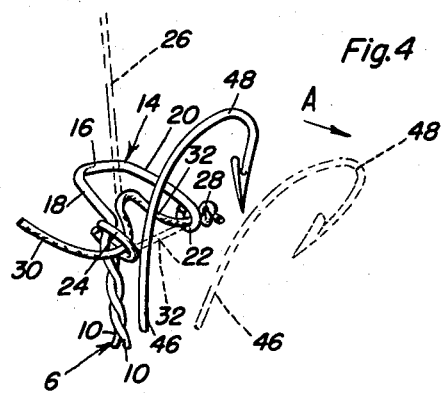
Ross Edwards
INVENTOR.

United States Patent Office 2,864,198
Patented Dec. 16, 1958

2,864,198

FISHING DEVICE WITH TRAP-HOOKS

Ross Edwards, Lubbock, Tex.

Application November 4, 1957, Serial No. 694,177

4 Claims. (Cl. 43—37)

The present invention relates to a fishing device characterized by a pair of conventional-type fish hooks one of which is baited, and the other one of which is cooperable therewith to function as a snagging-hook.

More specifically the invention has to do with a device characterized by a shank having a single eye at one end with which adjacent cooperating eyes of the two trap-hooks are hingedly connected. At the other end the shank is formed with a U-shaped part and the latter, in turn, is provided at the ends of its respective arms with eyes. There are two such eyes and they are aligned with each other. The free end of a fishing line is knotted and attached to one eye and an adjacent portion of the line, when it is in use is looped within and spans the open side of the U-shaped part.

The construction is further characterized by a coil spring which encircles the shank and has the coils at one end bearing against a shoulder on the shank and the coils at the other end cooperating with the several eyes, that is the eye on the shank and the two eyes at the adjacent ends of the trap-hooks. In this way, a novel construction is offered wherein when the fish takes the baited hook and exerts a pull and the fisherman exerts simultaneously a manual pull on the line in the opposite direction, the looped part of the line trips the snagging-hook whereby it is then spring biased to snag the fish, the two hooks together providing a satisfactory arrangement whereby the fish finds it difficult to free himself.

Specific objects, features and advantages of the invention not specifically discussed will become more readily apparent from the following description and the accompanying drawings.

In the drawing wherein like numerals are employed to designate like parts throughout the views:

Fig. 1 is a perspective view of a fishing device constructed in accordance with the invention and showing the snagging-hook set in its pull-actuated trippable position.

Fig. 2 is a side view taken substantially at right angles to Fig. 1 and observing it in a direction from right to left.

Fig. 3 is a view substantially like Fig. 1 but showing the trap-hooks side-by-side and with their shank portions encircled by the coil spring and which may be assumed to be the position of the hooks before being baited or set in the manner depicted in Fig. 1.

Fig. 4 is an enlarged fragmentary perspective view bringing out in greater detail the construction and functioning of the line-equipped U-shaped part.

Reference will be made first to Fig. 3 wherein it will be seen that the device proper is denoted as a structural entity by the numeral 6. It is preferably constructed from a length of wire which is bent upon itself somewhere intermediate its ends to define an eye 8, with the end portions of the wire twisted together as at 10 to define what has been described as a shank. The twisted portions of the wires are also fashioned into a lateral projecting stop shoulder 12. One end of the wire is fashioned into a U-bent or U-shaped part 14 having a bight portion 16 and arm portions 18 and 20. The free end of the arm portion 20 terminates in an eye 22. This is aligned with and opposite a somewhat larger eye 24 provided at the junctional connection between the shank and arm 18. These eyes permit attachment of an end portion of the fishing line 26 thereto. More specifically the free end of the line is passed through and beyond the eye 22 as shown in Fig. 4 where it is formed into a retaining and anchoring knot 28. The other adjacent portion 30 passes through and beyond the eye 24 and the intervening portion 32 bridges or spans the mouth of the U-shaped part. This can be drawn either taut and straight across between the two eyes 22 or 24 or it may be looped into a tripping bight as seen in Fig. 4. The aforementioned trap-hooks are denoted generally by the numerals 34 and 36 respectively. The hook 34 which is adapted to be baited comprises a shank 38 having a barbed fishing hook 40 at one end and an eye 42 at the other end joined hingedly to the eye 8. There is a similar eye 44 on the shank 46 of the hook 36. This is the snagging hook and the barbed hook portion 48 is conventional. If necessary the shank may have to be bent slightly as at 50 for better functioning. The aforementioned coil spring is denoted by the numeral 52 and the coils 54 at one end are adapted to bear against the stop shoulder 12 when the spring is in the set position seen in Fig. 1. At this same time the coils 56 at the other end press simultaneously against the several eyes 8, 42 and 44. This is brought out pictorially in Fig. 1. In the latter position the part 32 of the line is looped or bent into the U-shaped part 14 as shown in full lines in Fig. 4. It then forms a sort of a saddle and the shank of the hook 36 is then permitted to be pushed by hand into the space between the arms 18 and 20 and the coil spring bearing on the eye 44 tends to press the hooked end 48 over and against the arm 20. Thus the snagging-hook is set and ready to function as soon as the portion 32 of the line is tautened.

Whereas trap-hooks in the art are thought of as either spring-actuated or pull-actuated, the instant construction is an adaptation of both characteristics in that when the fish takes the baited hook 34 and exerts a get-away pull in one direction the angler will instinctively pull on the line 26 in the opposite direction thus tightening the looped portion 32 and tripping and freeing the snagging hook 36 from its set portion. In other words, the tightening of the loop 32 will virtually "kick" the hooked end 48 in the direction of the arrow A in Fig. 4. Then the contracted coil spring comes into play and exerts spring biased pressure on the eye-equipped or bent end 50 with the result that the snagging hook comes into play and in conjunction with the baited hook, a reasonably sure catch is had.

While the invention described may be used by a fisherman employing a rod and reel, or pole, much in the customary way, it was primarily designed to be suspended from a trot line; or alternatively, attached to some stationary support such as a wharf, boat, or the water's bank. In any event, its purpose is to preclude the possibility of escape of the fish particularly during the fisherman's absence. Manifestly, the hook if baited and left for a period, say overnight, the fish taking the bait does his own pulling and tripping of the snag hook and the fisherman has two chances to one of holding the catch. It is within the purview of the concept to employ a snag hook with either a single prong or a multiple prong construction.

The stem while shown twisted will not necessarily have to be made from twisted wire and it is within the purview of the invention to stamp it out of metal.

It is believed that the description taken in conjunction with the drawing will enable the reader to obtain a clear understanding of the construction and mode of effectually employing the trap-hooks.

What is claimed as new is as follows:

1. For use by a fisherman to catch fish, a pull and spring actuated trap-hook structure comprising a substantially rigid shank having a single eye at one end and a pair of aligned cooperating line accommodating eyes at the opposite end, said last named eyes being spaced from each other, a fishing line having one end cooperatively attached to one of the aligned eyes and having an adjacent portion passing slidingly through the other aligned eye, a first hook adapted to be baited and having a shank with an eye hingedly connected to the first-named eye, a second hook adapted to function as a snagging hook having a shank with an eye hingedly connected to said first-named eye, in such a manner that a portion thereof may be received between said line accommodating eyes whereby the same may be forced therefrom by a pull on said line and a coil spring adapted to encircle the shanks of the fish hooks when the latter are in side-by-side relationship.

2. The structure defined in claim 1 and wherein said shank is provided midway between its ends with a stop shoulder, the end coils at one end of the coil spring being engageable with said stop shoulder, and the end coils at the opposite end of said spring being engageable with said first named eye and also the eyes at the adjacent ends of the respective fish hook shanks.

3. The structure defined in claim 2 and wherein the pair of aligned eyes are formed on the ends of cooperating arms of a U-bend, said U-bend connected to one end of the shank by way of one of the arms of the U-bend.

4. A fishing and trapping device comprising a substantially rigid shank provided at one end with an eye, a first fish hook adapted to be baited and having an eye hingedly connected to said first named eye, a second fish hook adapted to function as a snagging-hook and having an eye hingedly connected to said first named eye, said shank being provided at an opposite end and with an extension which is bent upon itself to provide a U-bend, said U-bend having a bight portion and cooperating arm portions, one arm having a free end terminating in an eye, the other arm at the juncture between the shank and itself having another eye, said last-named eyes being aligned, a fishing line having one end attached to one of said eyes and having the adjacent end portion passing slidingly through the cooperating aligned eye, said shank being provided on its median portion with stop shoulder means, and a coil spring adapted to embrace said shank with one end bearing against the stop shoulder means and the other end bearing against the first-named eye as well as the eyes carried by said fish hooks, said coil spring being further adapted to slide over and beyond the three eyes when said hooks are disposed in side-by-side relation.

No references cited.